(12) United States Patent
Elam

(10) Patent No.: US 6,584,725 B1
(45) Date of Patent: Jul. 1, 2003

(54) FISHING ROD CLIPS

(76) Inventor: Joanne Elam, 1001 Chicago St., Greenville, IL (US) 62246

( * ) Notice: Subject to any disclaimer, the term of this patent is extended or adjusted under 35 U.S.C. 154(b) by 0 days.

(21) Appl. No.: 10/197,303

(22) Filed: Jul. 18, 2002

(51) Int. Cl.$^7$ ................................................. A01K 87/00
(52) U.S. Cl. .............................. 43/25; 43/25.2; 43/21.2
(58) Field of Search ........................... 43/25, 25.2, 21.2

(56) References Cited

U.S. PATENT DOCUMENTS

| | | |
|---|---|---|
| 3,992,799 A | 11/1976 | Oakes |
| 4,707,892 A | 11/1987 | Nelson |
| 5,341,590 A | 8/1994 | Hepworth |
| 5,794,375 A | 8/1998 | Wright |
| 5,950,346 A | 9/1999 | DaRosa |
| 6,021,597 A | 2/2000 | Lajoie |
| 6,178,685 B1 | 1/2001 | Broadway |

*Primary Examiner*—Charles T. Jordan
*Assistant Examiner*—Judith A Nelson
(74) *Attorney, Agent, or Firm*—Don W. Weber

(57) ABSTRACT

More than one clips are attached to the handle section of a divided fishing rod. The clips can be permanently attached to the fishing rod or can be snapped onto the rod. The upper part of the clip is horseshoe-shaped and spring loaded inwardly such that the free end section of the fishing rod can be inserted into the upper part of the clip and held in parallel orientation to the lower, handle section of the fishing rod. The lower part of the clip can either be a base which is glued or molded to the fishing rod or can be another inwardly biased horseshoe-shaped clip. The lower part of the detachable embodiment can be snapped onto the handle section of the rod at at least two locations. When the free end section of the rod is attached to the upper part of the clip, the two halves of the rod are held in parallel orientation to each other. The upper part of the clip also has outwardly turned ears to enable easier insertion of the rod into the clip.

5 Claims, 2 Drawing Sheets

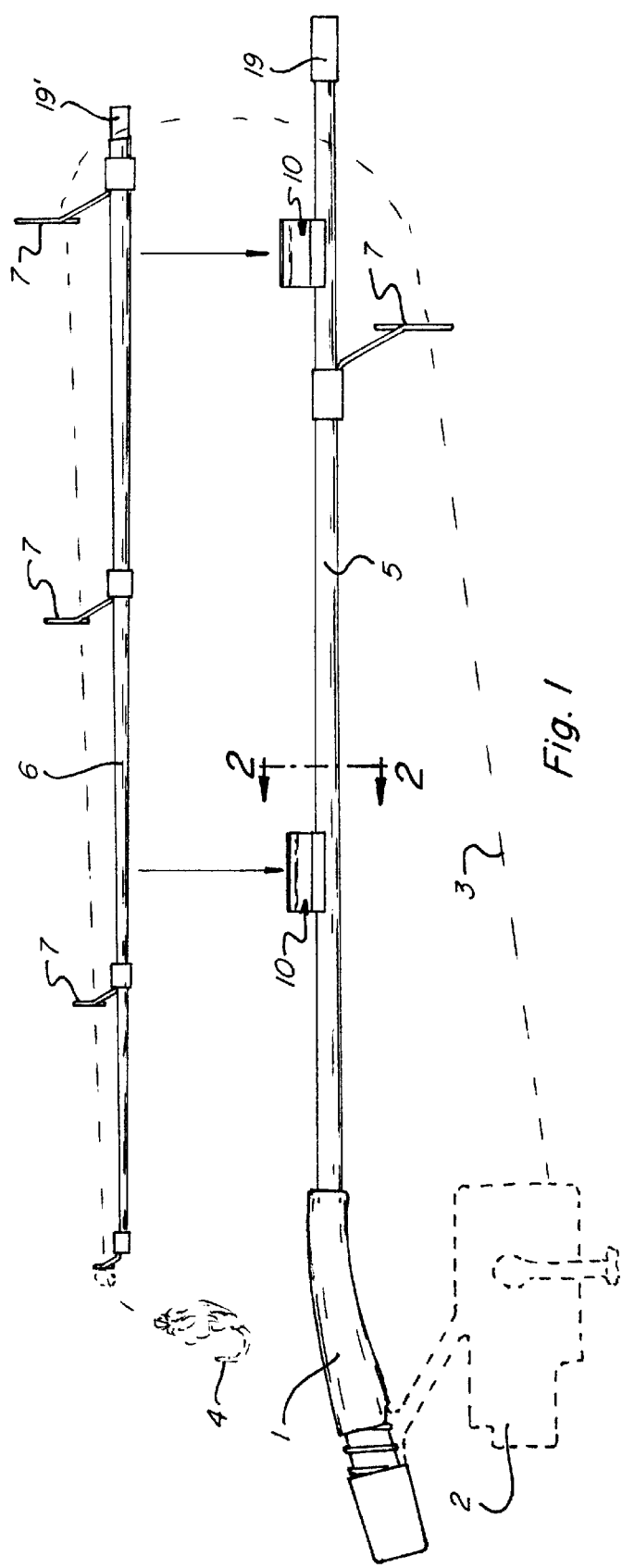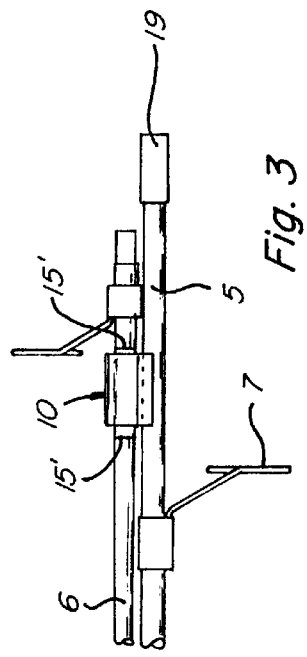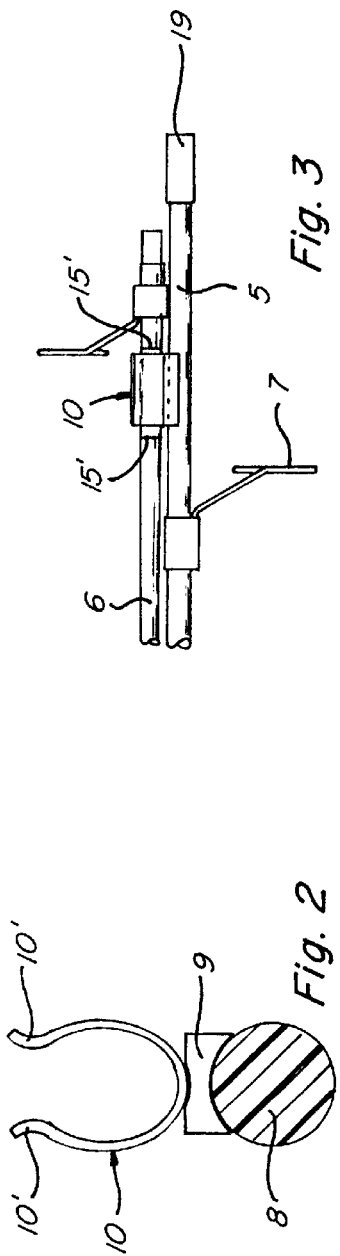

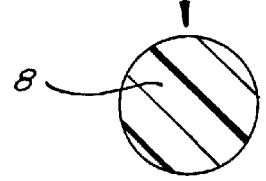
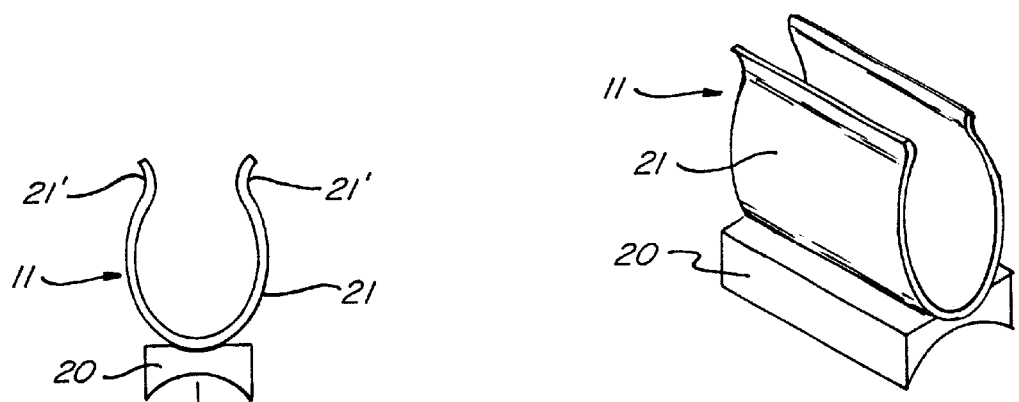
Fig. 4A
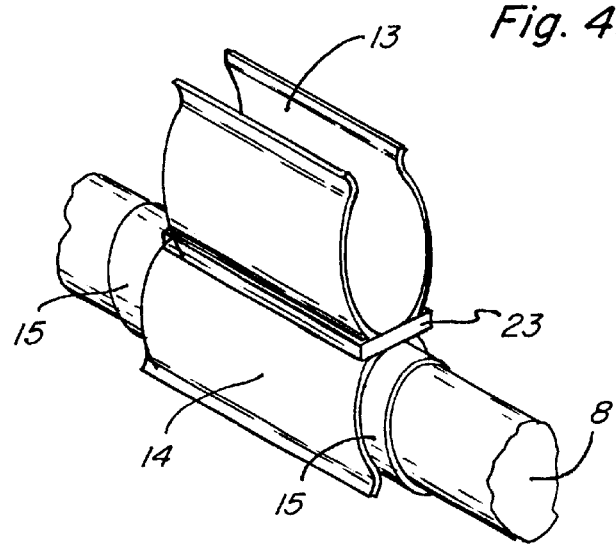
Fig. 4B
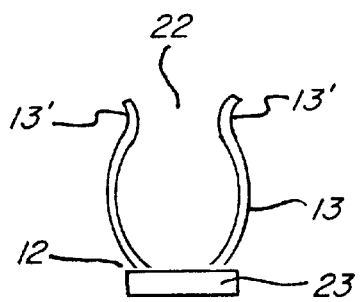
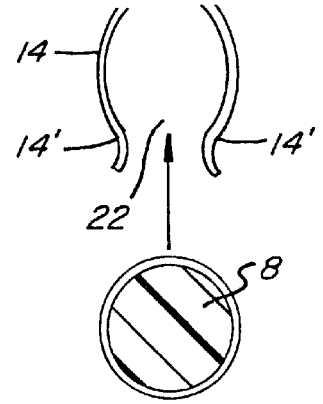
Fig. 5A
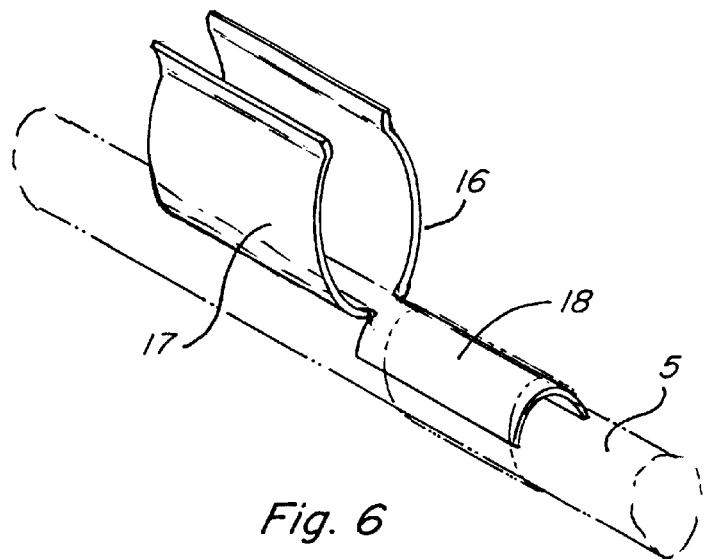

US 6,584,725 B1

FISHING ROD CLIPS

BACKGROUND OF THE INVENTION

This invention relates to the field of fishing. More particularly, permanently attachable or detachable clips are provided for securing the two sections of a fishing rod together in a parallel configuration.

Fishing has been known for thousands of years. Over time, advancements have been made to the fishing rod field. For example, earlier rods consisted only of a pole, line and hook. Modern innovations have included reels, sophisticated hooks and lures, and different types of fishing line. Attempts have even been made to light a fishing rod using fiber optic materials.

In order to transport most fishing rods, it is convenient to separate the rods into half sections. The half sections may then be folded together to reduce the overall length of the rod by one-half One of the problems encountered in taking the rod apart and storing it is that the fishing line, eyelets, reel and fishing rod sections themselves often become entangled and are difficult to separate and reattach. It is an object of this invention to provide a means for keeping the two sections of the fishing rod separate. It is a further object of this invention to maintain the parallel relationship of the two fishing rod sections so as to keep the fishing line from becoming tangled.

Fishing rods are produced by a number of manufacturers. It may be advantageous to provide a complete fishing rod having clip sections that are completely removable or permanently attached to the rod prior to purchase to enable the purchaser to disassemble the rod and attach the two sections of the rod together in parallel fashion using pre-market, completely removable or permanently attachable clips. It is another object of this invention to provide a pre-market rod having completely removable or permanently attached clips which allow the two halves of the rod to be kept in parallel orientation for transportation or storage.

Many fishing rods have already been purchased and used by consumers. These fishing rods also may be separated into two halves, but would not have the pre-market fishing rod clips attached. Another object of this invention is to provide fishing rod clips which may be readily and permanently attached to the fishing rod by an after-market purchaser. A variation of this after-market fishing rod clip would include a detachable version. It is a still further object of this invention to provide after-market fishing rod clips which may be attached to a fishing rod to secure the two sections of the rod together in a parallel orientation. Other and further objects of this invention will become obvious upon reading the below described Specification.

BRIEF DESCRIPTION OF THE PREFERRED EMBODIMENT

A fishing rod clip is presented which may either be permanently or detachably attached to the handle section of the fishing rod. Normally, two such clips will be required for attaching purposes. Since a fishing rod is tapered, the handle end of the rod will normally have a larger tapered cross-section than the free end of the rod. A plurality of attaching clips is attached to the handle portion of the rod. The upper portion of the attaching clips has inwardly biased horseshoe-shaped clips adapted to receive the free end section of the fishing rod once it is detached from the handle section. When the free end section is inserted into the attaching clips, the handle end and free end sections of the fishing rod are held together in parallel orientation. The detachable embodiment of the clip has a lower, inwardly biased, horseshoe-shaped clip adapted to receive the handle portion of the rod.

BRIEF DESCRIPTION OF THE DRAWINGS

FIG. 1 is a side, exploded view of the fishing rod showing the reel and line and hook in phantom.

FIG. 2 is a cutaway cross section of the rod and permanently attachable clip embodiment, taken along lines 2—2 of FIG. 1.

FIG. 3 is a partial side view of the detached fishing rod, showing the free end portion and the handle end portion in parallel orientation using the fishing rod clip.

FIG. 4A is a perspective view of the after-market permanently attachable fishing rod clip.

FIG. 4B is a cross section similar to FIG. 2 showing the permanently attachable fishing rod clip to be attached to the fishing rod handle portion.

FIG. 5A is a figure similar to FIGS. 2 and 4*b*, showing the detachable attaching clip as it may be attached to the handle portion of the fishing rod.

FIG. 5B is a perspective view of the detachable fishing rod clip, showing it in its attached position on the handle portion of the fishing rod.

FIG. 6 is an alternative embodiment of the clip showing a horseshoe-shaped inwardly biased fishing rod clip attachable by a wing portion.

DETAILED DESCRIPTION OF THE PREFERRED EMBODIMENT

A fishing rod as shown in FIG. 1 may be readily divided into a handle section and a free end section. The handle section comprises a fishing rod handle 1 which is permanently connected to the tapered handle section 5, as shown. The fishing rod tapers from larger to smaller from the handle end to the female connector 19, as shown in FIG. 1. The tapered handle portion 5 also has connected to it near the handle 1 a reel 2. A fishing line 3 runs from the reel 2 through eyelets 7 and exits the free end of the rod as shown in FIG. 1. A hook 4 or other lure may be attached to the free end of the fishing line 3 as shown.

Detachably connected to the tapered handle section 5 of the fishing rod is a tapered free end section 6. This tapered free end section 6 normally has a male section 19' which fits into the female connector 19 on the handle section 5 of the fishing rod. This male connector 19' may be smooth or may be threaded. The free end section 6 of the fishing rod is also tapered such that its cross section is smaller near the hook 4 than it is near the male connector 19'. Eyelets 7 are also positioned along the length of the handle section 5 and free end section 6 to guide and help maintain the fishing line 3 in proper relationship to the length of the connected rod.

A fishing rod generally has a circular cross section 8, as shown in FIGS. 2, 4B and 5A. While the cross section 8 is generally circular, the cross section is smaller as one moves from the handle towards the hook of the fishing rod shown in FIG. 1.

Turning now to FIG. 2, a cutaway view of the permanently attached, inwardly biased horseshoe-shaped clip 10 is shown. The horseshoe-shaped clip 10 in this embodiment comprises a solid clip base 9 which may be attached to the handle section of the fishing rod by various means, including gluing or single-body construction molding. The clip 10 is inwardly biased as shown in FIGS. 2, 4B and 5A. The outer ends of the clip itself also has outwardly protruding flange ears 10' as shown. The outwardly protruding flange ears 10' enable the free end section 6 of the tapered fishing rod to fit readily and easily within the clip 10, as best shown in FIG. 3.

As shown in FIG. 3, when the free end section of the fishing rod 6 is attached into the clip 10, the free end section of the rod 6 is affixed in substantially parallel orientation to the length of the handle section 5 of the rod. Maintaining the handle section 5 and free end section 6 in substantially parallel orientation as shown in 3 prevents the line from tangling and prevents the other parts of the rod from becoming intermixed. Stops, such as described below, may also be placed on the free end section where appropriate to keep the rods stationary with respect to their lengths.

Many fishing rods will be able to be produced with the fishing rod clip as shown in FIGS. 1 through 3, permanently attached to the fishing rod prior to the rod being marketed. However, permanently attachable fishing rod clips as shown in FIGS. 4A and 4B may also be sold as an after-market addition to fishing rods already in use. The after-market permanently attached fishing rod clip is best shown in FIGS. 4A and 4B. The permanently attachable clip 11 comprises a lower clip base 20 and an upper, inwardly biased horseshoe-shaped clip 21. The horseshoe-shaped clip 21 also has outwardly protruding flange ears 21', similar to the flange ears 10' shown in FIG. 2.

When the after-market permanently attachable clip 11 is sold, usually in pairs, the clip 11 may be permanently attached to the fishing rod handle section 5 as shown in FIG. 1. The permanently attachable clip 11 will then be used as shown in FIGS. 1 and 3. The use of at least two of these clips will keep the free end section 6 of the fishing rod in essentially parallel orientation to the handle section 5.

Another embodiment of this particular invention is shown in FIGS. 5A and 5B. This detachable fishing rod clip 12 comprises two inwardly biased horseshoe-shaped clips 13 and 14 as best shown in FIG. 5A. The upper portion 13 of the detachable fishing rod clip is inwardly biased as shown and has upper outwardly protruding flange ears 13'. The lower portion 14 of the detachable fishing rod clip has flanged ears 14' as shown. The two clips are joined by a block 23 similar to block 20 of the permanently attached embodiment 11 such that the clip openings 22 are at opposite ends of the fishing rod clip 12. The block 23 is needed so that the handle section 5 and the end section 6 are separated when the rod end 6 is placed in the upper part 13 of clip 12. The block 23 is slightly larger on one clip to accommodate the tapered geometry of the two rod halves. The lower part 14 of the detachable fishing rod clip 12 is adapted to receive the cross section 8 of the fishing rod as shown in FIGS. 5A and 5B. When this clip 12 is attached to the handle section 5 of the fishing rod as shown in FIG. 5B, the free end section 6 of the fishing rod may then be inserted into the upper part 13 of the detachable clip 12. In order to keep the fishing rod clips in a specific, set location along the length of the handle section 5 of the rod, tape 15 or other types of stops are attached to the rod at the desired location. These stops 15 keep the fishing rod clip 12 from sliding along the length of the rod. The free end section 6 may also have stops 15' to ensure that the clips do not slide out of position.

In the detachable clip embodiment as shown in FIGS. 5A and 5B, the size of the upper 13 and lower 14 inwardly biased horseshoe-shaped clips can differ due to the taper of the fishing rod along its total length. The detachable clip can also be produced such that each clip is the same size. The size of the clips chosen would depend on the dimensions of various rods now on the market. The lower part 14 of the fishing rod clip 12 will thus be slightly larger than the upper part 13 of the attachable fishing rod clip 12. This slightly enlarged lower section is due to the fact that the handle section 5 of the rod is larger than the free end section of the tapered rod.

A final embodiment of the attachable fishing rod clip is shown in FIG. 6. This wing embodiment 16 has structure similar to the fishing rod clips previously described. However, a wing 18 is attached to the upper clip 17. This wing 18 may then be attached to the fishing rod section 5 by means of tape or by other attaching means such as gluing. Another wing (not shown) may also be attached on the other side of the clip portion for firmer attachment to the rod. The clip portion 17 of the wing embodiment 16 has an upper structure adapted to receive the tapered free end section 6 of a divided fishing rod.

One advantage of the use of these clips is that the line and reel can still be maintained on the fishing rod as the two halves of the fishing rod fold together. While several attempts have been made to accommodate the folding of the rod while still keeping the reel and line from becoming entangled in the eyelets and sections of the rod, no prior art has disclosed the exact structure utilizing the inwardly biased horseshoe-shaped clips for maintaining the parallel orientation of the two sections of the rod.

The fishing rod clip may most desirably be made of inwardly biased, spring tensioned plastic. However, an inwardly biased metal embodiment is also within the keeping and disclosure of this invention. The lower clip base may be made of any substantial material and attached to the fishing rod in a variety of ways. The specific method of attaching the permanently attachable clips to the fishing rod as shown and described in the Specification is meant as a means of illustration only and not as a limitation. Obviously, many means of attaching the clip to the rod may be utilized while still keeping within the spirit and disclosure of this invention.

For the detachable clip shown in FIG. 5A, the upper and lower sections of the clip would be approximately the same size. However, these dimensions are approximate only and would be adapted to accommodate the handle section and free end section of the many fishing rods which are currently in use in the fishing trade and sport. For example, deep-sea fishing rods might have an overall diameter of several inches, while small children's fishing rods might have an overall diameter of less than ¼ inch. The dimensions of the lower base of the clip are designed to fit within the cross sections of fishing rods.

The tape shown and described and used as a stop may consist of a small pinstripe stop on the rod body or may comprise broader conventional tape, or even raised annular flanges machined into the rod. Wrapped and lacquered thread could also be used as a stop. Other means could also be utilized for the stops while still keeping within the scope of this invention.

Having fully described my device I claim:

1. A fishing rod assembly, said rod divided into first and second sections, comprising:
   a pair of attached clips, each clip having an upper, horseshoe-shaped, inwardly biased, upper clip adapted to detachably receive a first section of a fishing rod; and
   each attached clip having a lower base permanently attached to a second section of a fishing rod;
   further comprising stops, positioned along the first section of said fishing rod on each side of each upper clip, in a set location.

2. A plurality of clips for a fishing rod as in claim 1, said upper clip further comprising outwardly protruding flange ears attached to the outer ends of said horseshoe shape.

3. A plurality of clips for a fishing rod as in claim 1, said lower base comprising at least one wing adapted to be attached to a second section of a fishing rod.

4. A fishing rod assembly, said rod divided into first and second sections, comprising:

a pair of detachable clips, each detachable clip having an upper, horseshoe-shaped, inwardly biased upper clip adapted to detachably receive a first section of said fishing rod; and each detachable clip having a lower base comprising a horseshoe-shaped, inwardly biased lower clip attached to said upper clip, adapted to detachably receive a second section of said fishing rod;

further comprising stops, positioned along the first and second sections of said fishing rod on each side of each upper and lower clip, in a set location.

5. A plurality of clips for a fishing rod as in claim 4, further comprising outwardly protruding flange ears attached to the outer ends of each of said upper and lower horseshoe shapes.

* * * * *